Dec. 20, 1966 W. SICHAK ETAL 3,293,552

PHASE SLOPE DELAY

Filed Feb. 13, 1964 2 Sheets-Sheet 1

INVENTORS
WILLIAM SICHAK
JACK B. HARVEY
ROBERT T. ADAMS
BY Hopgood & Calimafde
ATTORNEYS

PHASE SLOPE DELAY

Filed Feb. 13, 1964 2 Sheets-Sheet 2

INVENTORS
WILLIAM SICHAK
JACK B. HARVEY
ROBERT T. ADAMS
BY Hopgood & Calimafde
ATTORNEYS United States Patent Office 3,293,552
Patented Dec. 20, 1966

3,293,552

PHASE SLOPE DELAY

William Sichak, Nutley, Jack B. Harvey, Clifton, and Robert T. Adams, Short Hills, N.J., assignors, by mesne assignments, to Communication Systems, Incorporated, Carson City, Nev., a corporation of Nevada Filed Feb. 13, 1964, Ser. No. 344,621
8 Claims. (Cl. 328—56)

This invention relates to an arrangement for fixedly or variably delaying an incident signal in response to an electrical indication.

In various applications, it is necessary to have an electrically controlled delay, the value of which may be made to change relatively instantaneously in response to a control signal. Heretofore, several arrangements have been proposed which would effect such a result; each, however, exhibits disadvantages. For example, quartz delay sections are available which are mechanically adjustable to vary the delay, and although large delays (up to 5000 microsec.) may be introduced by such elements, the variation thereof mechanically is impractical for high speed applications. Lumped constant delays on the other hand, while adjustable in either the inductive or capacitive (or both) parameters at high speed, present problems in maintaining a stable characteristic impedance while undergoing variation. Moreover, while lump constant delays may be elementally cascaded and switched in order to effect the desired delay, the arrangement tends to become increasingly cumbersome in size when the requirements for a large delay arise. While this factor in and of itself may not be grounds for dismissing its utilization in some systems, the distortion introduced by this type of device creates problems of compensation not easily solvable without resorting to prohibitive amounts of additional equipment.

Arrangements, such as signal storage in, for example, a matrix memory with subsequent feed-out at a time designated by the delay required, becomes grossly unpractical (at 3 mc. bandwidth a 6 million bit storage is required) when wideband applications are concerned. Needless to say, other conventional delay devices raise similar objections.

Accordingly, it is an object of this invention to provide an electronically variable delay capable of high speed wideband application with a minimum of distortion.

It is another object of this invention to provide an electronically variable delay easily controllable in response to a voltage dependent upon the desired delay.

It is another object of this invention to provide an electronically variable delay which exhibits a smooth transition upon variation, obviating signal and information loss as a result of switching transients.

Briefly, the invention is predicated upon the concept of "slicing" the spectrum of the signal to be delayed into bands, adding a phase shift to each band proportional to its center frequency, and recombining the output to produce a delayed replica of the original signal; with a delay proportional to the slope of the added phase shift.

Figure 1A:
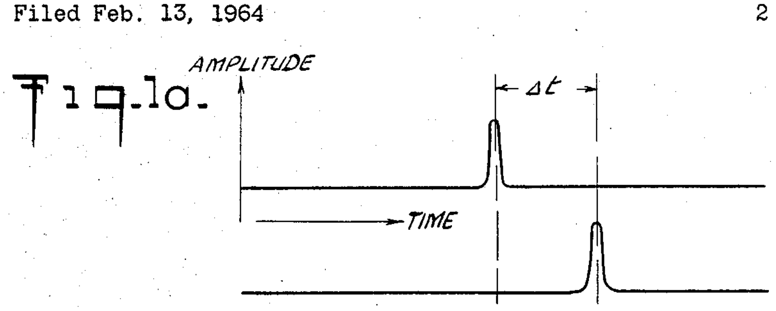
Figure 1B:
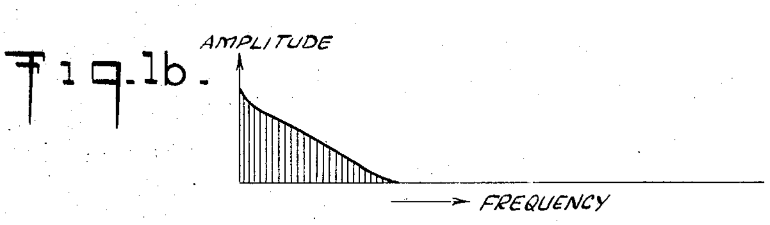
Figure 1C:
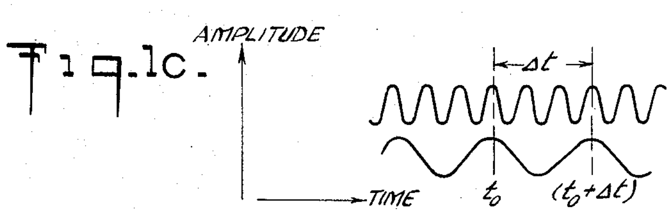
Figure 2A:
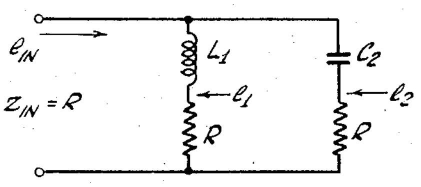
Figure 2B:
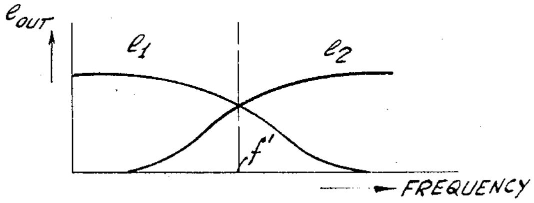
Figure 3A:
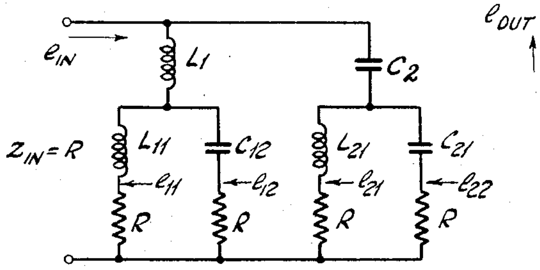
Figure 3B:
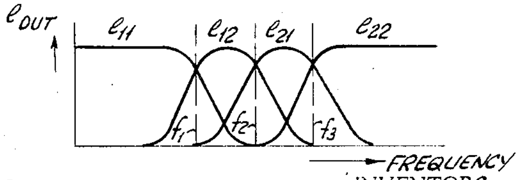
Figure 4A:
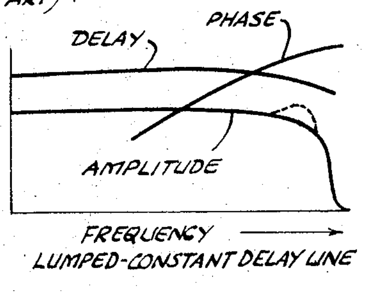
Fig. 4a. (PRIOR ART)
Figure 4B:
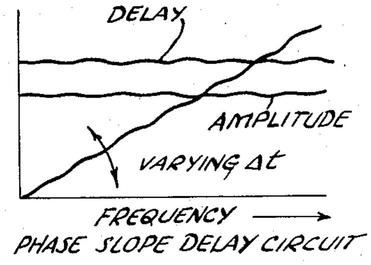
Figure 5:
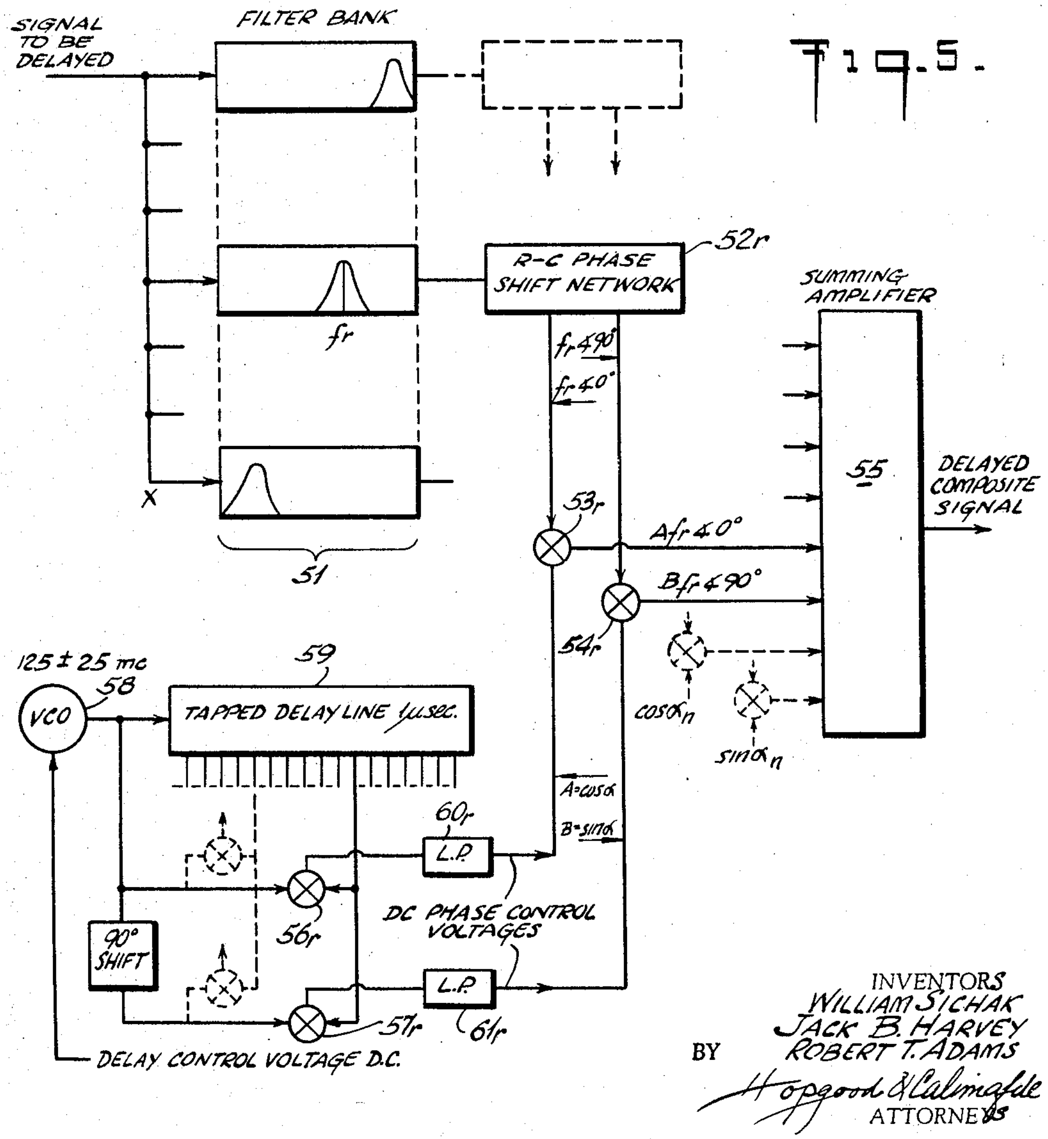

The above mentioned and other features and objects of this invention and the manner of attaining them will become more apparent, and the invention itself will be best understood by reference to the following description of an embodiment of the invention, taken in conjunction with the accompanying drawings, wherein:

FIGS. 1(*a*)–1(*c*) illustrate the frequency and time domain relationships involved in delaying an incident signal;

FIGS. 2(*a*) and 2(*b*) show a basic two band all-pass structure and the voltage-frequency characteristics thereof;

FIGS. 3(*a*) and 3(*b*) illustrate the network of FIG. 2(*a*) extended by iteration and its voltage-frequency characteristics;

FIGS. 4(*a*) and 4(*b*) are a graphic comparison of conventional and phase-slope delay techniques; and FIG. 5 illustrates schematically, the phase-slope variable delay circuit of the invention.

Inasmuch as the phase slope delay technique of the invention operates in the less familiar frequency domain rather than the conventional time domain, the relationships involved will first be examined with respect to FIG. 1, in order to lay a proper foundation for an understanding of that which follows.

FIG. 1(*a*) shows a pulse waveform, and the same waveform delayed by an amount $\Delta t$. Although a pulse has been chosen as illustrative, it will be appreciated that the discussion is equally valid for any waveform. FIG. 1(*b*) illustrates the frequency spectrum of both the original and delayed pulse (assuming their identity). As may be seen, the pulse is composed of an infinite number of individual frequency components which when taken together describe the shape under consideration. FIG. 1(*c*) represents the actual voltage waves of two typical Fourier components of the spectrum, in which one wave is three times the frequency of the other. From the relative phasing of the Fourier components, it may be seen that if all the components are shifted (delayed) by an amount $\Delta t$ the composite waveform, which is the sum of all Fourier components, will be similarly shifted. As shown in FIG. 1(*c*), this delay may be accomplished by shifting the phases of the Fourier components by an amount inversely proportional to their wavelengths. In other words, in order to retain the integrity of the original signal, when delaying the individual components, each component must be shifted in proportion to its frequency; the phase shift being a linear function of frequency, the slope of which is determined by $\Delta t$ (the delay desired).

The "slicing" of the frequency spectrum into the components above alluded to may be performed by a network derived from the basic all-pass structure shown in FIG. 2(*a*). This circuit which is closely related to the familiar cross-over networks in loudspeaker systems, is a classical LCR network which exhibits a constant input impedance (purely resistive) at all frequencies when the relationship between parameters is $R=\sqrt{L/C}$.

$$\frac{1}{Z_{in}}=\frac{1}{R+jwL}+\frac{1}{R-j(1/wC)}$$

but $$R^2=L/C$$

$$\therefore \frac{1}{Z_{in}}=\frac{2R^2+j(wL-1/wC)}{2R^2+jR(wL-1/wC)}$$

and $$\frac{1}{Z_{in}}=\frac{1}{R}$$

From the following it may be seen that the sum of the voltages across the resistances R (the output voltages) is identical with the input voltage at all frequencies.

$$e_1=e_{in}\left(\frac{R}{R+jwL}\right);\ e_2=e_{in}\left(\frac{R}{R-j(1/wC)}\right)$$

$$e_1+e_2=e_{in}\frac{R[2R+j(wL-1/wC)]}{R^2+L/C+jR(wL-1/wC)}$$

but $$L/C=R^2$$

$$\therefore \frac{2R^2+jR(wL-1/wC)}{2R^2+jR(wL-1/wC)}=1$$

and $$e_1+e_2=e_{in}$$

The result shown in FIG. 2(*b*), is a spectrum divided into two bands (with a cross-over frequency $f'$ at $1/(2\pi\sqrt{LC})$) in such a manner that the sum of the outputs $e_1$ and $e_2$ reproduces the input waveform without phase shift, delays or frequency distortion.

FIG. 3(*a*) shows the same network extended by iteration; with each of the original resistors replaced by the input resistance of a similar network. Here the LC products, determinative of the cross-over frequencies $f_1$, $f_2$ and $f_3$ follow the relationship $$L_{11}C_{12}>L_1C_2>L_{21}C_{21}$$

to establish the four band "slicing" shown in FIG. 3(*b*), and again:

$$e_{11}+e_{12}+e_{21}+e_{22}=e_{in}$$

at all frequencies. Extending the process the spectrum of the input waveform may be subdivided as finely as necessary without disturbing the response of any associated system.

Since the process just described is basically a transform of conventional delay networks, the phase-slope delay technique has properties closely related to conventional delay methods, but with certain significant differences. For a given delay bandwidth product both techniques require approximately the same number of L–C elements, since the basic problem is fine-grain storage of signal energy. The residual errors are somewhat different, however, as seen in FIGS. 4(*a*) and 4(*b*). Distortion in a conventional line (FIG. 4(*a*)) is commonly exhibited by broad curvatures of phase, delay and amplitude characteristics; with the maximum useful frequency being established by dispersion (differing high and low frequency delays). Using the phase-slope delay circuit, the basic phase, delay, and amplitude curves are straight lines, the latter two independent of frequency, with a fine ripple-structure superimposed when adjusted for maximum delay. The maximum useful delay is established by maximum tolerable ripple, while the useful bandwidth is predetermined by the filter design. In general, small ripple in the phase and amplitude characteristic will produce less distortion in a receiving system (particularly FM) since the actual magnitude of deviations from ideal phase is minimized.

Turning now to FIG. 5, the basic phase slope delay circuit of the invention may be seen. The incident signal is applied to the all-pass filter bank 51. Although conceptically illustrated for clarity, this bank is composed of the circuit of FIG. 3(*a*), extended by iteration. The output of each filter is fed to a simple R-C phase-shifter network having two outputs separated in phase by 90°. For simplicity only one such network $\mathbf{52}_r$ is shown, having parameters corresponding to the center frequency $f_r$ of the associated band. Throughout the following the subscript $r$ will denote equipment associated with the $f_r$ band only.

The two phase shifter outputs corresponding to the sine and cosine of the frequency $f_r$ are applied to balanced modulators $\mathbf{53}_r$ and $\mathbf{54}_r$. The other inputs of these balanced modulators are D.C. voltages proportional to the sine and cosine of a variable phase angle $\alpha$ whose derivation will be explained. Since:

$$\text{Cos } \alpha \sin 2\pi f_r T+\sin \alpha \cos 2\pi f_r T=\sin (2\pi f_r T+\alpha)$$

the sum of the two balanced modulator outputs equals the filter output shifted in phase by $\alpha$. Accordingly, inasmuch as the sum of each set of balanced modulator outputs effectively shifts its corresponding filter output, the sum of all modulator outputs produced by the summing amplifier 55 will produce a uniformly delayed (shifted) composite signal. The foregoing, however, is contingent upon an $\alpha$ whose value is dependent upon the band under consideration. That is, as previously mentioned, the angle $\alpha$ when plotted against the frequency to which it is applied, must give a substantially linear function, the slope of which is dependent upon the desired delay.

The means for obtaining this relationship stems from the derivation of the D.C. voltages representative of the sine and cosine of $\alpha$. The sine and cosine D.C. voltages are obtained from balanced modulators $\mathbf{56}_r$ and $\mathbf{57}_r$ whose inputs are: the voltage from the voltage controlled oscillator 58 and a voltage from a tap on the delay line 59 fed by the same VCO. The output of modulator $\mathbf{56}_r$ is:

$$\text{Sin } PT\times\sin P(T-\tau)=\tfrac{1}{2}\cos P\tau-\tfrac{1}{2}\cos (2PT-P\tau)$$

where $P=2\pi\times$oscillator frequency and $\tau$ is the delay. The output of modulator $\mathbf{57}_r$ is slightly different because of the 90° phase shift on the VCO input and is:

$$\text{Cos } PT\times\sin P(T-\tau)=\tfrac{1}{2}\sin P\tau+\tfrac{1}{2}\sin (2PT-P\tau)$$

By employing low-pass filters 60 and 61 to derive the D.C. components, the sine and cosine dependent functions required are available for application to modulators $\mathbf{53}_r$ and $\mathbf{54}_r$. Since the delay line has a tap corresponding to each set of associated balanced modulators, and each tap along the line introduces greater delay, the application of the resultant modulator outputs to the filter derived frequencies (fed to the other group of balanced modulators of which $\mathbf{53}_r$ and $\mathbf{54}_r$ are representative) produces the linear function sought. Thus for example the output of the first tap on the delay line is used to produce the D.C. sine and cosine voltages for the lowest signal frequency band, the second tap the sine and cosine voltages for the second lowest frequency band, and so on. A variation in the slop of phase vs. frequency, and hence the overall delay, is produced by varying the VCO control voltage. By so doing, the amount of phase shift obtained at each of the delay line taps also changes as a function of the distance along the line and a new uniform delay is effected in the incident signal. Thus for a total delay line delay of 1 $\mu$sec. and a VCO frequency of 100 mc. the total phase shift introduced by the line is 100 cycles. At a VCO frequency of 150 mc. the total shift is 150 cycles. This shift applied to a one mc. maximum signal frequency (applied to the all-pass filter) causes a maximum 50-cycle shift which corresponds to a delay of 50 $\mu$sec.

The maximum time delay of the phase-slope delay unit described is determined by the bandwidth of each element of the all-pass network. For an ideal (flat amplitude) initial adjustment, the 3 db point occurs at 90° phase shift per network section. By suitable choice of cross-over frequencies, the circuit will be flat to $\pm 1$ db for delays up to about 60°/section. On this basis assuming a desired delay range of 50 microseconds the required bandwidth of the sections will be $(60/360)(10^6/50)=3$ kc. The total number of sections depends on the signal bandwidth and for an incident signal of 1.5 mc. bandwidth, 500 sections would be necessary. The delay may be increased by decreasing the bandwidth and consequently increasing the number of sections (one halving the bandwidth, for example, doubles the delay). Alternatively, the circuit of FIG. 5 may be reiterated; each complete unit introducing a predetermined delay, and feeding the next unit.

From the foregoing analysis it will be apparent that although a delay line is employed, it does not appear in the signal path and hence it cannot produce the adverse effects alluded to previously.

While we have described above the principles of our invention in connection with specific apparatus, it is to be clearly understood that this description is made only by way of example and not as a limitation to the scope of our invention as set forth in the objects thereof, and in the accompanying claims.

What is claimed is:

1. A circuit for delaying an incident signal comprising: means for slicing the frequency spectrum of said signal into a plurality of bands; means coupled to said slicing means for adding a phase shift to each band proportional to the center frequency thereof; and means coupled to said adding means for combining the phase shifted bands and producing a delayed replica of the original signal.

2. A circuit for variably delaying an incident signal comprising: means for slicing the frequency spectrum of said signal into a plurality of bands; means coupled to said slicing means and responsive to an indication of the desired delay for adding a phase shift to each band dependent upon said indication and proportional to the center frequency of said band; and means coupled to said adding means for combining the phase shifted bands and producing a delayed replica of the original signal.

3. The circuit for variably delay an incident signal as claimed in claim 2 in which the means for adding a phase shift to each band comprises: means for deriving a pair of phase quadrature signals from each band; means for deriving a pair of D.C. voltages proportional to the sine and cosine respectively of a phase shift dependent upon the desired delay and proportional to the center frequency of said band; and means for combining said components and voltages.

4. The circuit for variably delaying an incident signal as claimed in claim 3 in which the means for deriving the D.C. voltages associated with the bands comprises: means for deriving a local signal, the frequency of which is a function of an indication of the desired delay; delay means coupled to said signal deriving means for interposing a plurality of phase shifts to said local signal, each of which is a function of the center frequency of an associated band; and means for combining individually a phase shifted and undelayed local signal to produce a plurality of pairs of phase quadrature signals having D.C. components; and means for deriving the said D.C. components.

5. The circuit for variably delaying an incident signal as claimed in claim 2 in which said means for slicing the spectrum into bands comprises an all-pass LCR iterative network in which the sum of the output voltages across the resistors equals the input voltage at all frequencies.

6. A circuit for variably delaying an incident signal comprising: means for slicing the frequency spectrum of said incident signal into a plurality of bands; means for deriving a pair of phase quadrature signals from each band; means for deriving a local signal the frequency of which is a function of an indication of the desired delay; a delay line having a plurality of taps, coupled to said local signal deriving means, for interposing a plurality of phase shifts to said local signal; said taps being located along the delay line so that each phase shift is a function of the center frequency of an associated band; means for combining individually a phase shifted and undelayed local signal to produce a plurality of pairs of phase quadrature signals having D.C. components; means for deriving the said D.C. components; means for individually combining associated D.C. components and phase quadrature signals from each band to produce a pair of signals the sum of which is the phase shifted signal of the associated band; and means for summing all of the signals derived from said last mentioned combining means.

7. The circuit for variably delaying an incident signal as claimed in claim 6 in which the local signal deriving means is a voltage controlled oscillator.

8. The circuit for variably delaying an incident signal as claimed in claim 6 in which each of said combining means comprises a pair of balanced modulators.

References Cited by the Examiner

UNITED STATES PATENTS

| | | | |
|---|---|---|---|
| 2,263,376 | 11/1941 | Blumlein et al. | 333—70 |
| 2,666,181 | 1/1954 | Courtillot | 333—70 |
| 3,086,172 | 4/1963 | Johnson | 328—56 |
| 3,100,284 | 8/1963 | Kerns | 329—14 |

ARTHUR GAUSS, *Primary Examiner.*

J. S. HEYMAN, *Assistant Examiner.*